(12) United States Patent
Lim (10) Patent No.: US 8,605,822 B2
(45) Date of Patent: Dec. 10, 2013

(54) APPARATUS AND METHOD FOR TRANSMITTING AND RECEIVING DATA

(75) Inventor: Jong Soo Lim, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 8 days.

(21) Appl. No.: 13/411,423

(22) Filed: Mar. 2, 2012

(65) Prior Publication Data
US 2012/0224655 A1 Sep. 6, 2012

(30) Foreign Application Priority Data

Mar. 4, 2011 (KR) .................. 10-2011-0019665
Feb. 13, 2012 (KR) .................. 10-2012-0014509

(51) Int. Cl.
*H04L 27/12* (2006.01)

(52) U.S. Cl.
USPC .......... 375/302; 375/260; 375/271; 375/295; 375/296; 375/316; 375/322; 375/324; 455/63.1; 455/67.13; 455/69; 455/91; 455/114.3; 455/130; 455/324; 455/522; 370/210; 370/480; 330/149

(58) Field of Classification Search
USPC ......... 375/260, 271, 295, 296, 302, 316, 322, 375/324; 455/91, 63.1, 67.13, 69, 114.3, 455/130, 324, 522; 370/210, 480; 330/149
See application file for complete search history.

(56) References Cited

U.S. PATENT DOCUMENTS

| 7,319,723 | B2 * | 1/2008 | Jung et al. | 375/296 |
| 7,430,243 | B2 | 9/2008 | Giannakis et al. | |
| 7,539,269 | B2 * | 5/2009 | Vadde et al. | 375/297 |
| 8,027,397 | B2 | 9/2011 | Kim et al. | |
| 8,351,874 | B2 * | 1/2013 | Dent et al. | 455/107 |
| 2006/0274641 | A1 * | 12/2006 | Grieco et al. | 370/210 |

FOREIGN PATENT DOCUMENTS

KR 1020070040716 A 4/2007

OTHER PUBLICATIONS

Steve C. Thompson et al., "Constant Envelope OFDM", IEEE Transactions on Communications, Aug. 2008, pp. 1300-1312, vol. 56 No. 8, IEEE.

* cited by examiner

*Primary Examiner* — Leon Flores (57) ABSTRACT

A data transmitting apparatus performs symbol mapping on each of first and second input data to generate a plurality of first and second modulation data symbols, performs inverse fast Fourier transform (IFFT) on the plurality of first and second modulation data symbols to convert the same into first and second real signals of a time domain from a frequency domain, angle-modulates the first and second real signals, and transmits the same to a data receiving apparatus. Thus, a peak-to-average power ratio (PAPR) can be lowered, while the same data transfer amount as that of the general OFDM data transmitting apparatus is maintained.

20 Claims, 9 Drawing Sheets

APPARATUS AND METHOD FOR TRANSMITTING AND RECEIVING DATA

CROSS-REFERENCE TO RELATED APPLICATION

This application claims priority to and the benefit of Korean Patent Application Nos. 10-2011-0019665 and 10-2012-0014509 filed in the Korean Intellectual Property Office on Mar. 4, 2011 and Feb. 13, 2012, the entire contents of which are incorporated herein by reference.

BACKGROUND OF THE INVENTION (a) Field of the Invention

The present invention relates to an apparatus and method for transmitting and receiving data and, more particularly, to an apparatus and method for transmitting and receiving data using orthogonal frequency-division multiplexing (OFDM) modulation and angle modulation.

(b) Description of the Related Art

OFDM, which can be implemented through a simple equalizer and has characteristics resistant to multi-path fading, is employed in various wireless communication systems such as a wireless local area network (WLAN), a wireless metropolitan area network (WMAN), digital audio broadcast (DAB), digital video broadcast (DVB), and the like.

However, since OFDM uses multiple carriers, in-phase signals are joined (or mixed) to generate a high peak-to-average power ratio (PAPR), and an operating point of a power amplifier of an OFDM transmitter is positioned in a nonlinear area due to the high PAPR, causing nonlinear distortion of signals. Thus, in order to reduce the influence of PAPR, in an OFDM system, a power amplifier is backed off, and herein if sufficient backoff is not provided to the power amplifier, a frequency spectrum of the system is widened and distortion is generated by modulation between frequencies, resulting in degradation of performance of the system.

SUMMARY OF THE INVENTION

The present invention has been made in an effort to provide an apparatus and method for transmitting and receiving data having advantages of lowering a peak-to-average power ratio (PAPR).

The present invention has also been made in an effort to provide an apparatus and method for transmitting and receiving data having advantages of having the same amount of data transmission as that of an orthogonal frequency-division multiplexing (OFDM) transmission device.

An exemplary embodiment of the present invention provides an apparatus for transmitting data. The data transmitting apparatus may include first and second symbol mapping units, first and second real signal converters (RSCs), and a single angle modulation unit. The first and second symbol mapping units may perform symbol-mapping on first and second input data to generate a plurality of first and second modulation data symbols, respectively. The first and second RSCs may convert the plurality of first and second modulation data symbols into first and second real signals of a time domain from a frequency domain, respectively. The single angle modulation unit may angle-modulate the first and second real signals, respectively, and transmit the same.

The angle modulation unit may angle-modulate the first and second real signals into a cosine signal and a sine signal, respectively, select one of angle modulation signals available for the first real signal as a first angle modulation signal with respect to the first real signal, and select one of angle modulation signals available for the second real signal as a second angle modulation signal with respect to the second real signal.

The angle modulation unit may select one of the angle modulation signals available for the second real signal, whose function format of a real part and an imaginary part of the first angle modulation signal is different, as the second angle modulation signal.

The first and second RSCs may convert the plurality of first and second modulation data symbols into first and second real signals through inverse fast Fourier transform (IFFT). Here, when the size of the IFFT is N, the number of the plurality of first and second modulation data symbols may be N/2 where N may be a positive integer.

Another embodiment of the present invention provides an apparatus for receiving data. The data receiving apparatus may include an angle demodulation unit, first and second real signal de-converters (RSDCs), and first and second symbol demappers. The angle demodulation unit may angle-demodulate a reception signal to extract a first phase estimation value with respect to first input data which has been angle-modulated in a data transmitting apparatus and a second phase estimation value with respect to second input data which has been angle-modulated in the data transmitting apparatus. The first and second RSDCs may convert the first and second phase estimation values into a plurality of first and second data symbols of a frequency domain from a time domain, respectively. The first and second symbol demappers may perform demapping on the plurality of first and second data symbols to restore the first and second input data.

The angle demodulation unit may calculate an average value from the reception signal, and extract phase estimation values with respect to the first and second input data from a signal obtained by subtracting the average value from the reception signal.

An imaginary part of a signal obtained by subtracting the average value from the reception signal may be a phase estimation value with respect to the first input data, a real part thereof may be a phase estimation value with respect to the second input data, and the first and second input data may be data which have been angle-modulated by a sine function, respectively.

Each of the first and second RSDCs may include a serial-to-parallel converter (SPC) converting the corresponding first and second phase estimation values from a serial signal to a parallel signal, a fast Fourier transform (FFT) unit performing FFT on the corresponding parallel signal to generate the plurality of first and second data symbols, and an output unit outputting a portion of the plurality of first and second data symbols to the first and second symbol demappers.

Yet another embodiment of the present invention provides a method for transmitting data by a data transmitting apparatus. The data transmission method may include: performing symbol-mapping on first and second input data to generate a plurality of first and second modulation data symbols; performing inverse-FFT (IFFT) on the plurality of first and second modulation data symbols to convert the plurality of first and second modulation data symbols into first and second real signals of a time domain from a frequency domain; angle-modulating the first and second real signals into first and second signals, respectively; and amplifying the amplitude of a sine component of each of the first and second signals and transmitting the same.

The transmitting may include amplifying the amplitude of the sign component of each of the first and second signals according to a pre-set gain value.

The performing of IFFT may include converting the plurality of first and second modulation data symbols into first and second real signals through IFFT. Here, when the size of the IFFT is N, the number of the plurality of first and second modulation data symbols may be N/2, respectively, and N may be a positive integer.

The first and second signals may include a cosine signal and a sine signal, respectively. The angle-modulating may include: selecting one of angle modulation signals available for the first real signal, as a first signal; and selecting one whose function format of a real part and an imaginary part of the first signal among the angle modulation signals available for the second real signal, as the second signal.

Still another embodiment of the present invention provides a method for receiving data by a data receiving apparatus. The data receiving method may include: compensating for the amplitude of a reception signal by an amount which has been adjusted by a data transmitting apparatus; angle-demodulating the amplitude-compensated reception signal to extract first and second phase estimation values with respect to first and second input data which have been angle-modulated by the data transmitting apparatus; performing fast Fourier transform (FFT) on the first and second phase estimation values to convert the first and second phase estimation values into first and second parallel data symbols of a frequency domain from a time domain; and demapping the first and second parallel data symbols to restore them into first and second input data.

The size of the FFT may be N, and the number of first and second parallel data symbols may be N/2. Here, N may be a positive integer.

The extracting may include: calculating an average value from the reception signal; extracting a phase estimation value with respect to the first input data from an imaginary part of a signal obtained by subtracting the average value from the reception signal; and extracting a phase estimation value with respect to the second input data from an imaginary part of the signal obtained by subtracting the average value from the reception signal. Here, the first and second input data may be data which have been angle-modulated by a sine function, respectively.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

An apparatus and method for transmitting and receiving data according to embodiments of the present invention will now be described with reference to the accompanying drawings.

Figure 1:
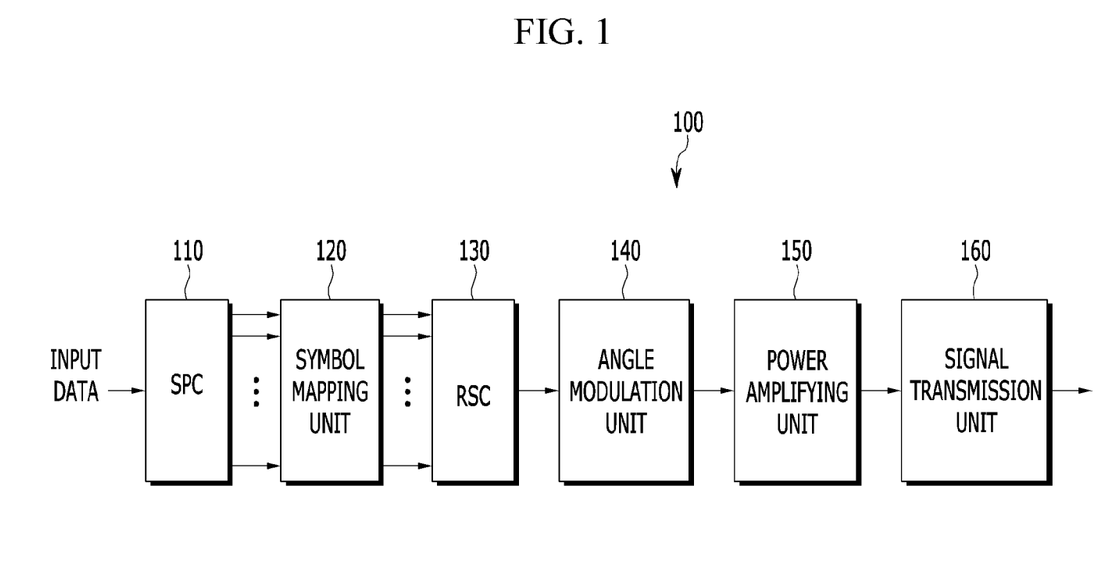
FIG. 1 is a schematic block diagram of a constant envelope orthogonal frequency division multiplexing (CE-OFDM) data transmitting apparatus according to a first embodiment of the present invention.
Figure 2:
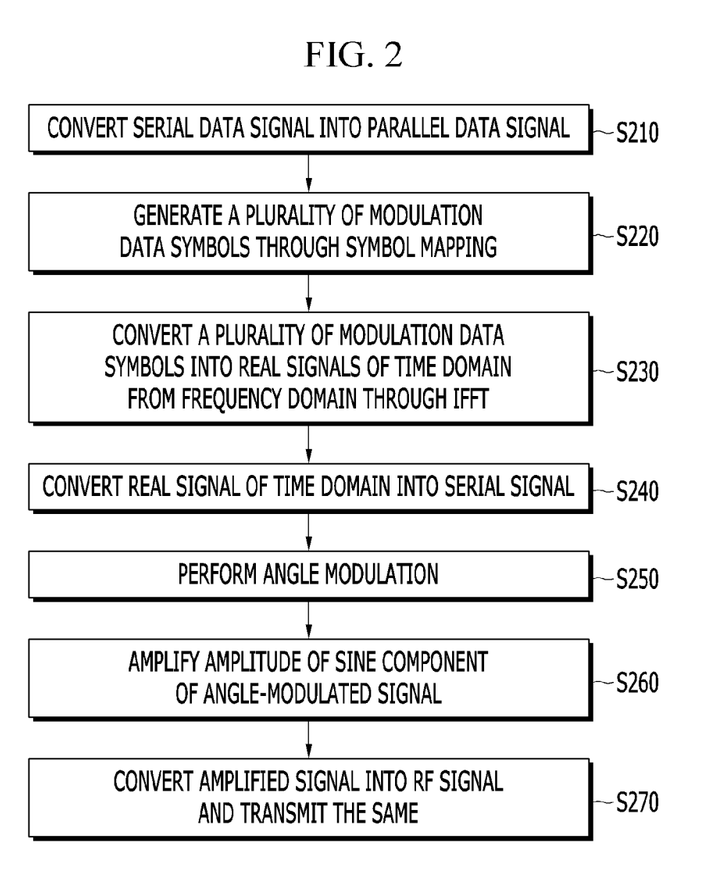
FIG. 2 is a flowchart illustrating the process of a method for transmitting data by a CE-OFDM data transmitting apparatus according to the first embodiment of the present invention.
Figure 3:
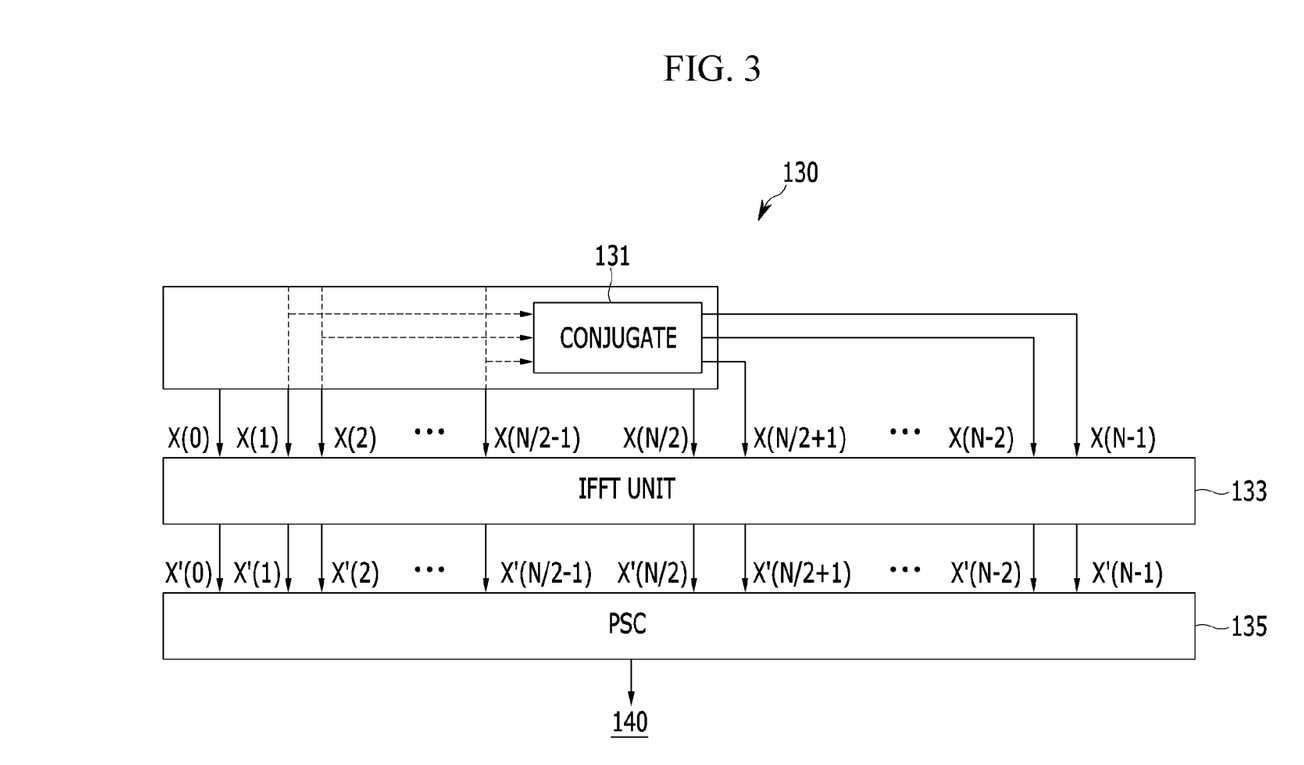
FIG. 3 is a view showing the RSC illustrated in FIG. 1.

FIG. 1 is a schematic block diagram of a CE-OFDM data transmitting apparatus according to a first embodiment of the present invention, and FIG. 2 is a flowchart illustrating the process of a method for transmitting data by a CE-OFDM data transmitting apparatus according to the first embodiment of the present invention. FIG. 3 is a view showing the RSC illustrated in FIG. 1.

With reference to FIG. 1, a constant envelope orthogonal frequency division multiplexing (CE-OFDM) data transmitting apparatus 100 includes a serial-to-parallel converter (SPC) 110, a symbol mapper 120, a real signal converter (RSC) 130, an angle modulation unit 140, a power amplifying unit 150, and a signal transmission unit 160.

With reference to FIG. 2, when a plurality of serial data signals corresponding to bit type input data are input, the SPC 110 converts the plurality of serial data into a plurality of parallel data signals (S210).

The symbol mapping unit 120 performs symbol mapping on the plurality of parallel data signals through digital modulation such as BPSK (binary phase shift keying), QAM (quadrature amplitude modulation), 16-QAM, 64-QAM, or the like, to generate a plurality of modulation data symbols (S220).

In order to angle-modulate the plurality of modulation data symbols by the angle modulation unit 140, the plurality of modulation data symbols should be converted into real signals, and this function is performed by the RSC 130.

With reference to FIG. 3, the RSC 130 includes an input signal processing unit 131, an inverse fast Fourier transform (IFFT) unit 133, and a parallel-to-serial converter (PSC) 135.

When the size of the IFFT unit 133 is N, the number of modulation data symbols may be N/2. Thus, the input signal processing unit 131 inputs N/2 number of modulation data symbols and N/2 number of conjugated symbols obtained by conjugating and the N/2 number of modulation data symbols to the IFFT unit 135. Namely, the input signals [X 0, X 1, ..., X (N/2−1)] of the IFFT unit 133 corresponds to N/2 number of modulation data symbols, and the input signals [X N/2, X (N/2+1), ..., X 2N−1] of the IFFT unit 133 correspond to N/2 number of conjugated symbols obtained by conjugating the N/2 number of modulation data symbols. The $0^{th}$ modulation data symbol is 0, and thus the modulation data symbol input as input signals [X 0, (X N/2)] is 0. That is, N/2 number of modulation data symbols are used as the input signals [X 1, ..., X (N/2−1)], and modulation data symbols corresponding to the input signal [X(N−k)] may be conjugated to be used as the input signals [X (N/2+1), ..., X N−1]. Here, k is N/2+1, N/2+2, ..., N−1

The input signal processing unit 131 may normalize the plurality of modulation data symbols such that the average power is 1.

The IFFT unit 133 performs IFFT on input signals [(X 0, X 1, . . . , X N−1)]. Then, the modulation data symbols are converted into real signals [(X' 0, X' 1, . . . , X' N−1] of a time domain from a frequency domain.

The PSC 135 converts the real signals [(X' 0, X' 1, . . . , X' N−1] from parallel signals to serial signals.

In this manner, the RSC 130 performs IFFT on the plurality of modulation data symbols to convert the modulation data symbols of the frequency domain into real time signals of the time domain (S230) and converts the real signals of the time domain into the serial signals (S240).

The angle modulation unit 140 angle-modulates the real signals which have been converted by the RSC 130 to adjust the amplitude of the real signals (S250). A phase modulation scheme may be used as an angle modulation scheme.

The angle modulation unit 140 varies a gain such that the real signals converted by the RSC 130 are within a range from −π/2 to π/2, thus adjusting the amplitude of the real signals. Here, π is the ratio of the circumference of a circle to its diameter. Here, the angle modulation unit 140 may angle-modulate the amplitude-adjusted real signals into a cosine signal and a sine signal.

The power amplifying unit 150 amplifies the amplitude of the sine component of the angle-modulated signal according to a pre-set gain value to control a PAPR (S260). Here, when the gain value is adjusted, the PAPR can be adjusted, and when the gain value is set to be 1, the PAPR may be lowered to be 0 dB.

The signal transmission unit 160 converts the signal amplified by the power amplifying unit 150 into an RF signal and transmits the same (S270).

In this manner, the CE-OFDM data transmitting apparatus 100 modulates input data through OFDM modulation and angle modulation and transmits the same, and the combination scheme of the OFDM modulation and the angle modulation is the CE-OFDM.

The CE-OFDM data transmitting apparatus 100 may satisfy OFDM characteristics resistant to multi-path fading and have the characteristics in which amplitude is uniform, and the PAPR can be lowered to 0 dB through the OFDM modulation and the angle modulation.

However, as shown in FIG. 3, when the size of the IFFT unit 133 is N, since the number of modulation data symbols is N/2, a data transfer amount of the CE-OFDM data transmitting apparatus 100 is reduced to be ½ in comparison to the general OFDM data transmitting apparatus. Thus, a CE-OFDM data transmitting apparatus that may not reduce a data transfer amount in comparison to the general OFDM data transmitting apparatus will be described with reference to FIGS. 3 to 5.

Figure 4:
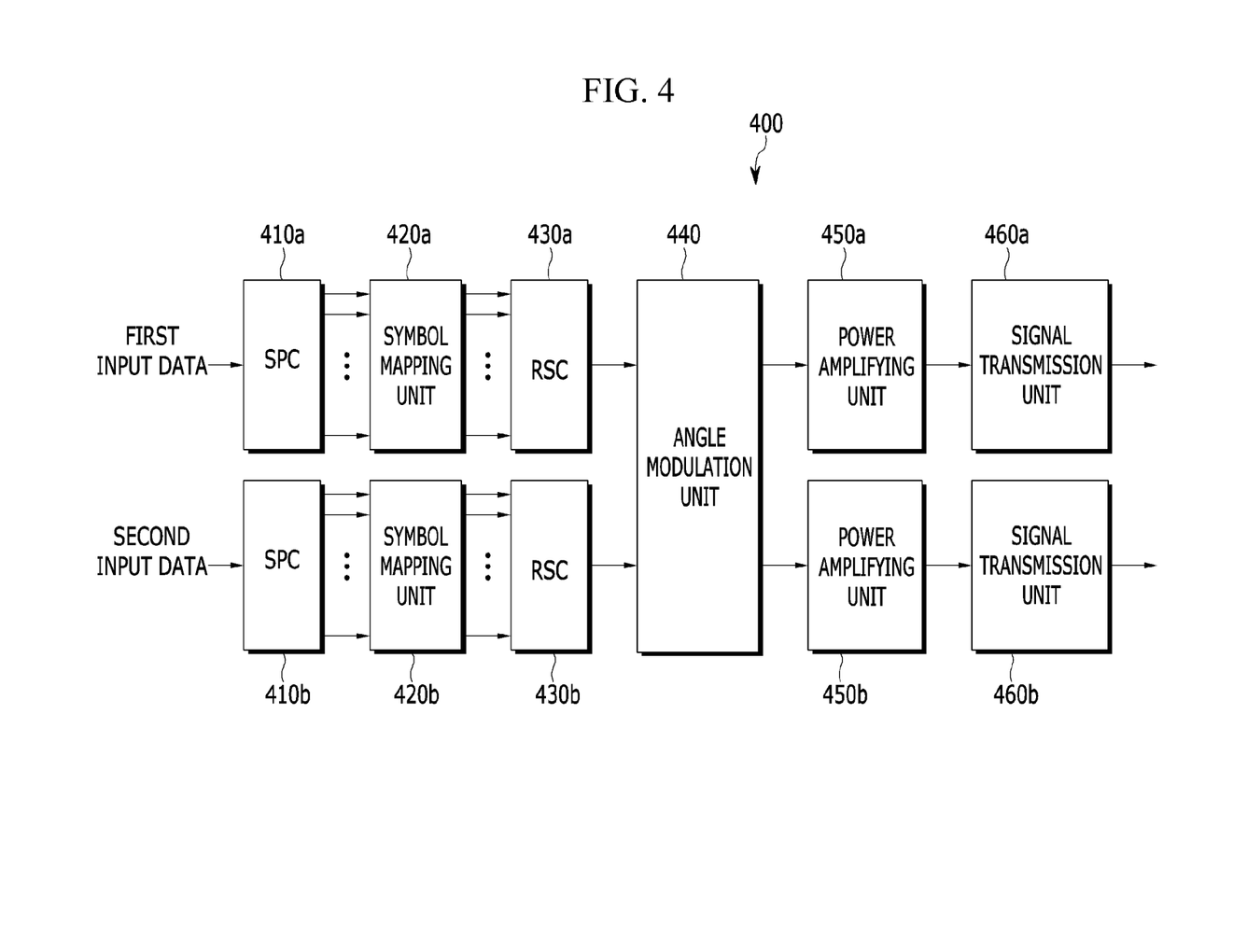
FIGS. 4 to 6 are schematic block diagrams of CE-OFDM data transmitting apparatus according to second to fourth embodiments of the present invention.

FIG. 4 is a schematic block diagram of a CE-OFDM data transmitting apparatus according to a second embodiment of the present invention.

With reference to FIG. 4, a CE-OFDM data transmitting apparatus 400 includes SPCs 410a and 410b, symbol mappers 420a and 420b, RSCs 430a and 430b, an angle modulation unit 440, power amplifying units 450a and 450b, and signal transmission units 460a and 460b.

That is, the CE-OFDM data transmitting apparatus 400 has the same configuration as that of the CE-OFDM data transmitting apparatus 100 according to the first embodiment of the present invention, except that it includes two SPCs 410a and 410b, two symbol mappers 420a and 420b, two RSCs 430a and 430b, two power amplifying units 450a and 450b, and two signal transmission units 460a and 460b, excluding the angle modulation unit 440, in order to have the same data transfer amount as that of the general OFDM data transmitting apparatus.

The operation of the SPCs 410a and 410b, the symbol mappers 420a and 420b, the RSCs 430a and 430b, the power amplifying units 450a and 450b, and the signal transmission units 460a and 460b is the same as that of the SPC 110, the symbol mapper 120, the RSC 130, the power amplifying unit 150, and the signal transmission unit 160.

The angle modulation unit 440 receives real time signals of a time domain with respect to first and second input data from the RSCs 430a and 430b, angle-modulates the received real signals of the time domain, and outputs the same.

When the output signal from the RSC 430a with respect to the first input data is Xk and the output signal from the RSC 430b with respect to the second input data is Yk, available angle modulation signals with respect to the first input data may be cos(Xk)+j*sin(Xk), −cos(Xk)+j*sin(Xk), cos(Xk)−J*sin(Xk), −cos(Xk)−j*sin(Xk), sin(Xk)+j*cos(Xk), −sin(Xk)+j*cos(Xk), sin(Xk)−j*cos(Xk), and −sin(Xk)−j*cos(Xk). Also, available angle modulation signals with respect to the second input data may be cos(Yk)+j*sin(Yk), −cos(Yk)+j*sin(Yk), cos(Yk)−j*sin(Yk), −cos(Yk)−j*sin(Yk), sin(Yk)+j*cos(Yk), −sin(Yk)+j*cos(Yk), sin(Yk)−j*cos(Yk), and −sin(Yk)−j*cos(Yk).

The angle modulation unit 440 selects one of the available angle modulation signals with respect to the first input data and transmits the selected angle modulation signal to the power amplifying unit 450a, and selects one of available angle modulation signals with respect to the second input data and transfers the selected angle modulation signal to the power amplifying unit 450b. In this case, the angle modulation unit 440 selects an angle modulation signal with respect to the second input data whose real part and imaginary part are different from those of the angle modulation signal with respect to the first input data selected from among the angle modulation signals with respect to the second input data. That is, when the real part of the selected angle modulation signal with respect to the first input data is a cosine function and the imaginary part thereof is a sine function, the angle modulation signal with respect to the second input data whose real part is a sine function and imaginary part is a cosine function may be selected. For example when the angle modulation signal with respect to the first input data is cos(Xk)+j*sin(Xk), the angle modulation signal with respect to the second input data may be any one of sin(Yk)+j*cos(Yk), −sin(Yk)+j*cos(Yk), sin(Yk)−j*cos(Yk), and −sin(Yk)−j*cos(Yk).

In the CE-OFDM data transmitting apparatus 400, since two SPCs 410a and 410b, two symbol mappers 420a and 420b, two RSCs 430a and 430b, two power amplifying units 450a and 450b, and two signal transmission units 460a and 460b operate in parallel, the CE-OFDM data transmitting apparatus 400 can have the same data transfer amount as that of the general OFDM data transmitting apparatus.

Figure 5:
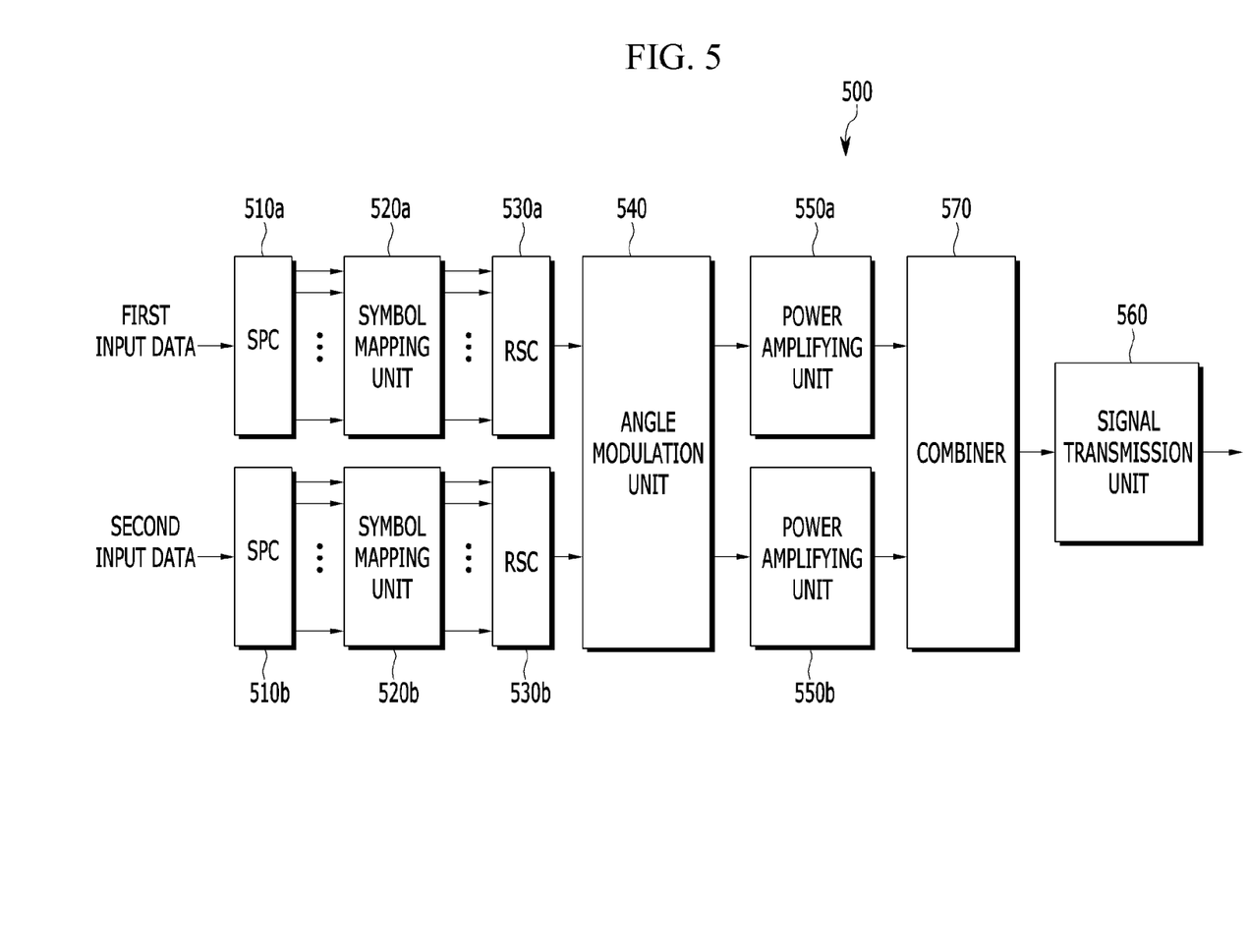

FIG. 5 is a schematic block diagram of a CE-OFDM data transmitting apparatus according to a third embodiment of the present invention.

With reference to FIG. 5, a CE-OFDM data transmitting apparatus 500 has the same configuration as that of the CE-OFDM data transmitting apparatus 400 according to the second embodiment of the present invention, except that the CE-OFDM data transmitting apparatus 500 includes a single signal transmission unit 560, and to this end, the CE-OFDM data transmitting apparatus 500 further includes a combiner 570 for combining output signals from power amplifying units 550a and 550b.

The combiner 570 combines output signals from the power amplifying units 550a and 550b into a single signal, so the first and second input signals can be CE-OFDM modulated and transmitted through the single signal transmission unit 560.

Figure 6:
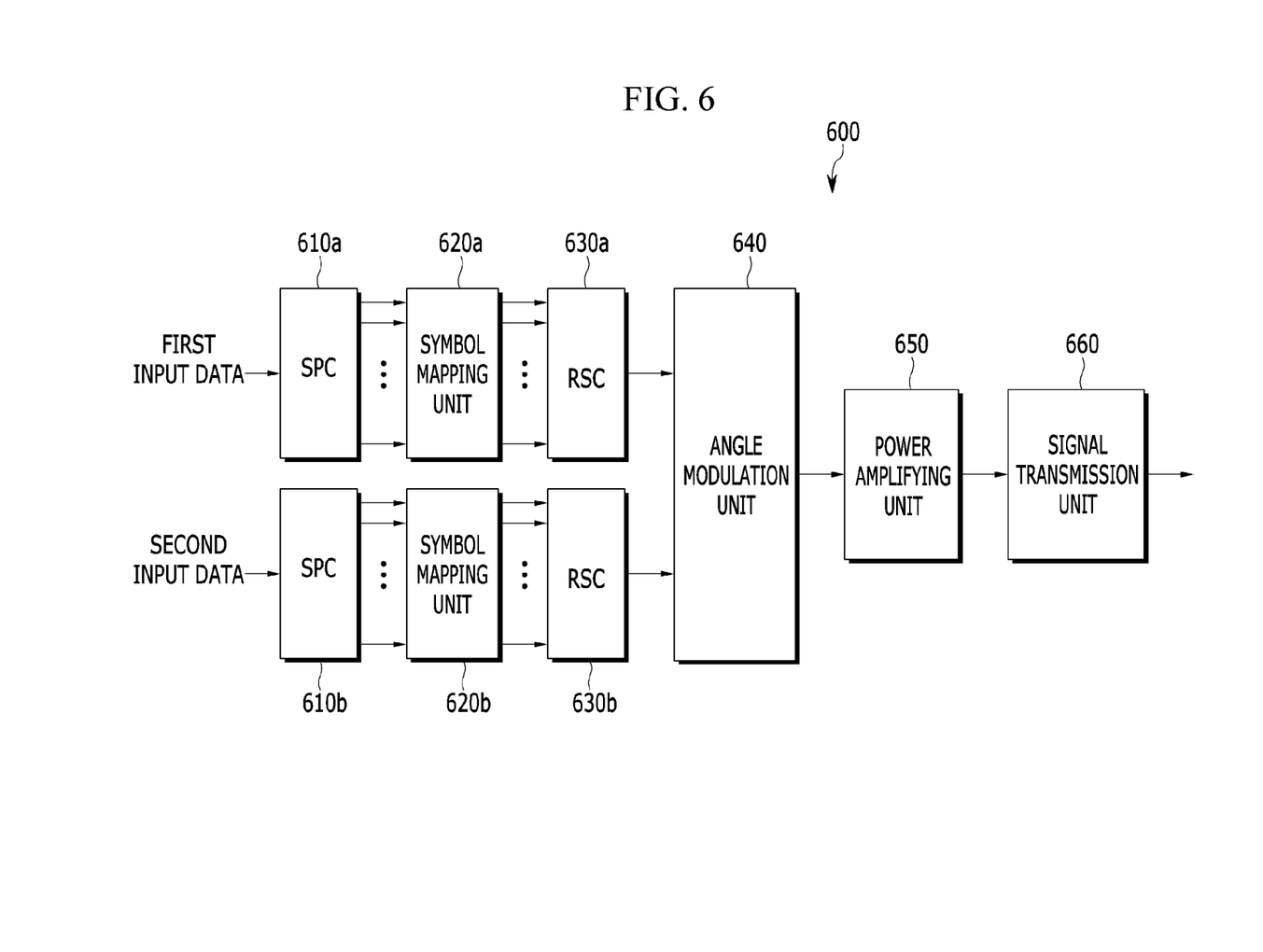

FIG. 6 is a schematic block diagram of a CE-OFDM data transmitting apparatus 600 according to a fourth embodiment of the present invention.

In order to use a single signal transmission unit 660, as shown in FIG. 6, angle modulation signals with respect to the first and second input data selected by an angle modulation unit 640 may be combined into a single signal. The angle modulation unit 640 combines a real part of the angle modulation signal with respect to the first input data and a real part of the angle modulation signal with respect to the second input data, and combines an imaginary part of the angle modulation signal with respect to the first input data and an imaginary part of the angle modulation signal with respect to the second input data. For example, when the angle modulation signal with respect to selected one first input data is cos(Xk)+j*sin(Xk) and the angle modulation signal with respect to selected one second input data is −sin(Yk)−j*cos(Yk), the angle modulation unit 640 outputs (cos(Xk)−sin(Yk))+j*(sin(Xk)−cos(Yk)).

Then, the single power amplifying unit 650 and the single signal transmission unit 660 may be used at a rear stage of the angle modulation unit 640, thus reducing complexity of the configuration of the CE-OFDM data transmitting apparatus 600.

A CE-OFDM data receiving apparatus corresponding to the CE-OFDM data transmitting apparatuses 400, 500, and 600 according to second to fourth embodiments of the present invention will be described with reference to FIGS. 7 and 8.

Figure 7:
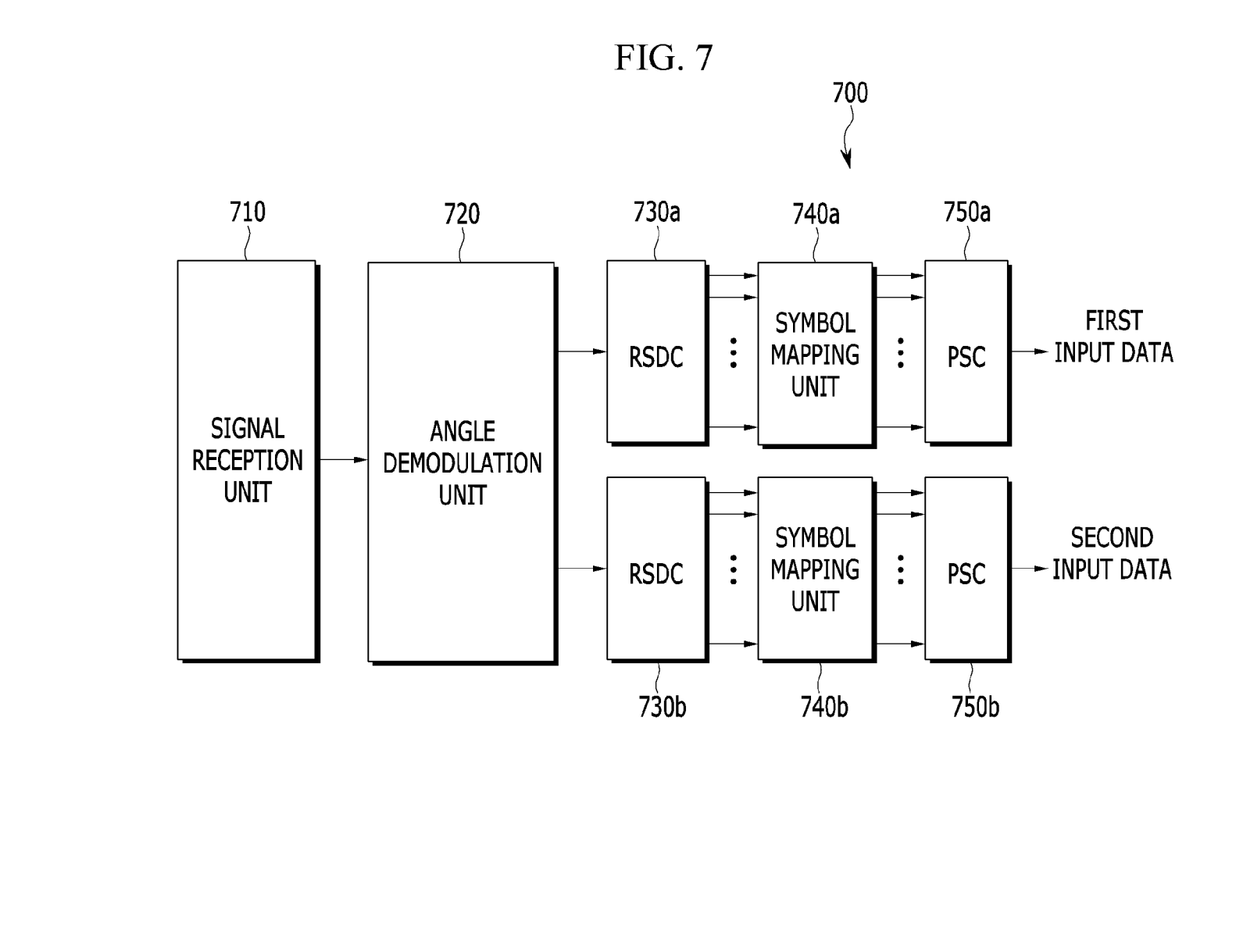
FIG. 7 is a schematic block diagram of a CE-OFDM data receiving apparatus according to an embodiment of the present invention.
Figure 8:
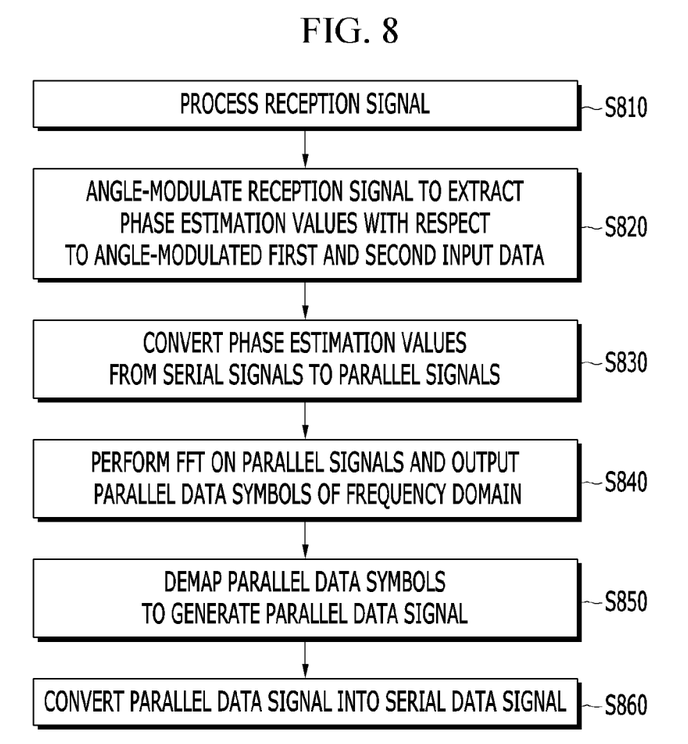
FIG. 8 is a flowchart illustrating the process of a method for receiving data by the CE-OFDM data receiving apparatus according to an embodiment of the present invention.

FIG. 7 is a schematic block diagram of a CE-OFDM data receiving apparatus according to an embodiment of the present invention, and FIG. 8 is a flowchart illustrating the process of a method for receiving data by the CE-OFDM data receiving apparatus according to an embodiment of the present invention.

With reference to FIG. 7, a CE-OFDM data receiving apparatus 700 includes a signal reception unit 710, an angle demodulation unit 720, real signal de-converters (RSDCs) 730a and 730b, symbol demappers 740a and 740b, and PSCs 750a and 750b. The CE-OFDM data receiving apparatus 700 perform an operation of reverse processes of the CE-OFDM data transmitting apparatuses 400, 500, and 600.

With reference to FIG. 8, the signal reception unit 710 processes a reception signal (S810). The signal reception unit 710 may compensate for the amplitude, which has been adjusted by the power amplifying units (i.e., the power amplifying units 450a and 450b in FIG. 4), of the reception signal.

The angle demodulation unit 720 angle-demodulates the amplitude-compensated reception signal (S820). Then, the phase estimation values with respect to the first and second input data of the CE-OFDM data transmitting apparatuses 400, 500, and 600 can be obtained.

The angle demodulation unit 720 calculates an average value of the reception signal, and calculates the phase estimation values of the angle-modulated first and second input data by subtracting the average value from the reception signal. For example, when the reception signal R is (cos(Xk)−sin(Yk))+j*(sin(Xk)−cos(Yk)) and the average value of the reception signal R is M, an imaginary part of the signal (R−M) obtained by subtracting the average value from the reception signal is the phase estimation value of Xk, and a real part of the signal (R−M) obtained by subtracting the average value from the reception signal is the phase estimation value of Yk.

Here, Xk is the first input data angle-modulated with a sine function and Yk is the second input data angle-modulated with the sine function.

The angle-demodulation unit 720 transfers the angle-modulated first and second input data and transfers the phase estimation values of the angle-modulated first and second input data to the RSDCs 730a and 730b, respectively.

The RSDCs 730a and 730b convert the phase estimation values of the angle-modulated first and second input data from serial signals to parallel signals (S830), perform FFT on the converted parallel signals to convert the parallel signals of a time domain into parallel data symbols of a frequency domain, and output the same (S840).

The symbol demappers 740a and 740b demap the parallel data symbols of the frequency domain output from the corresponding RSDCs 730a and 730b through digital demodulation such as BPSK, QAM, 16-QAM, 64-QAM, or the like, to generate parallel data signals (S850). The symbol demappers 740a and 740b may demap the plurality of parallel data symbols in a constellation according to a demodulation scheme corresponding to the modulation scheme performed in the CE-OFDM data transmitting apparatuses 400, 500, and 600 into a plurality of parallel data signals.

The PSCs 750a and 750b convert the plurality of parallel data signals output from the corresponding symbol demappers 740a and 740b into serial data signals and output the same (S860), thereby restoring the CE-OFDM modulated signals into the first and second input data.

Figure 9:
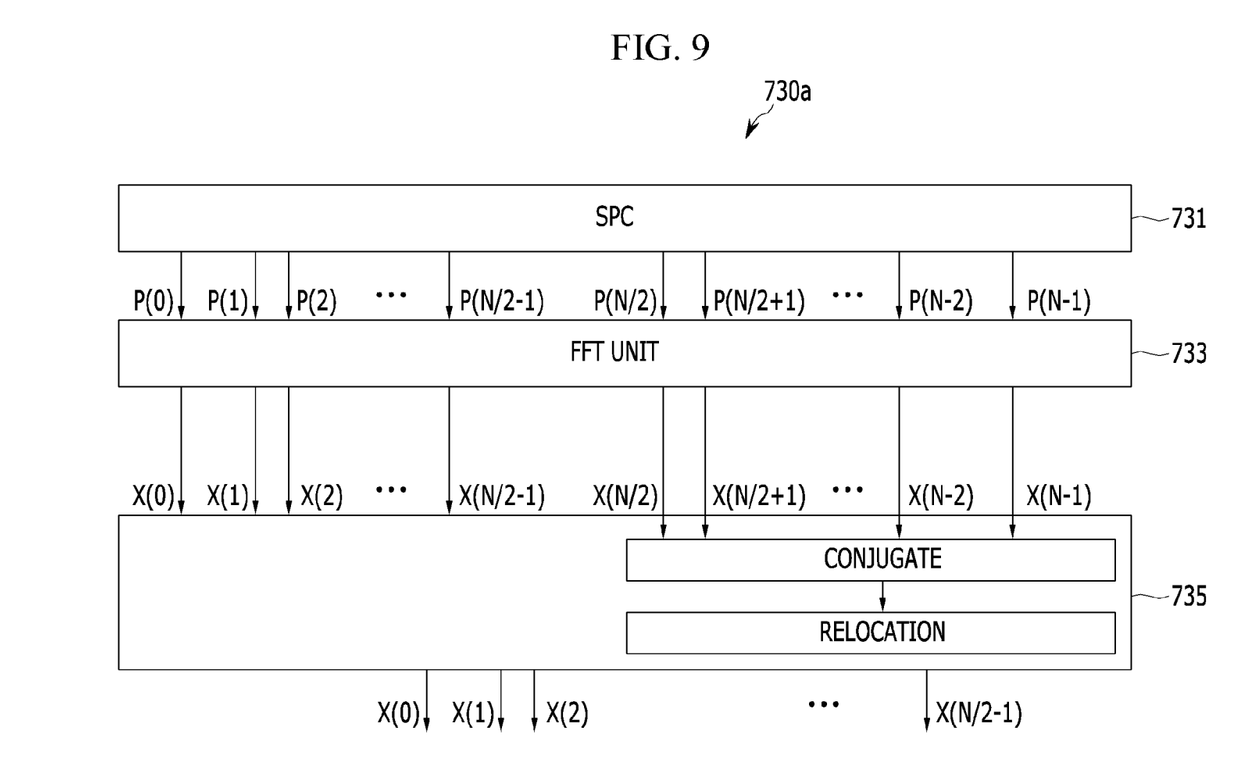
FIG. 9 is a view showing the RSDC illustrated in FIG. 7.

FIG. 9 is a view showing the RSDC illustrated in FIG. 7.

FIG. 9 illustrates only one RSDC 730a for the sake of explanation, and the RSDC 730b may also be configured in the same manner as that of the RSDC 730a.

With reference to FIG. 9, the RSDC 730a includes an SPC 731, an FFT unit 733, and an output unit 735.

In order to perform FFT on a signal corresponding to a phase estimation value, the SPC 731 converts the signal corresponding to the phase estimation value from a serial signal to a parallel signal and outputs the same to the FFT unit 733.

When the parallel signal converted by the SPC 731 is input as an input signal [P 0, P 1, . . . , P N−1] to the FFT unit 733, the FFT unit 733 performs FFT on the input signal [P 0, P 1, . . . , P N−1]. Then, the input signal [P 0, P 1, . . . , P N−1] is converted into a data symbol [X 0, X 1, . . . , X N−1] of a frequency domain from a time domain.

The output unit 735 outputs the signal [(X 0, X 1, . . . , X (N/2−1)] of the frequency domain, among the data symbols [(X 0, X 1, . . . , X N−1] of the frequency domain, to the symbol demapper 740a. Here, the output unit 735 may output the data symbol [(X 0, X 1, . . . , X (N/2−1)) as it is to the symbol demapper 740a, or may conjugate the data symbol [X (N/2+1), . . . , X N−1] of the frequency domain, relocate the data symbol at the position of X(N−k), and then output the same to the symbol demapper 740a. Here, k is N/2+1, N/2+2, . . . , N−1. For example, in case of the symbol [X N−1] of the frequency domain after FFT is performed, the symbol demapper 740a may conjugate the symbol [X N−1] of the frequency domain, and then relocate the same at the position of X(1).

According to embodiments of the present invention, since the CE-OFDM modulation scheme is used, OFDM characteristics resistant to multi-path fading can be satisfied, and the characteristics in which amplitude is uniform can be obtained. Also, since the shortcomings that a data transfer amount is reduced to half in the CE-OFDM modulation scheme, in comparison to the existing OFDM scheme, are resolved, the CE-OFDM modulation scheme can have the same data transfer amount as that of the general OFDM modulation scheme.

Thus, the CE-OFDM modulation scheme can obtain a high transfer amount in a visible light communication environment in which uniform brightness of light is required and multiple paths exist, and thus, it can be applicable to a realistic broadcasting service, such as an ultra high definition television (UHDTV), or the like.

The embodiments of the present invention may not necessarily be implemented only through the foregoing devices and methods but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A data transmitting apparatus comprising:
    a first symbol mapping unit performing symbol-mapping on a first input data to generate a plurality of first modulation data symbols;
    a second symbol mapping unit performing symbol mapping on a second input data to generate a plurality of second modulation data symbols;
    a first real signal converter (RSC) converting the plurality of first modulation data symbols into first real signals of a time domain from a frequency domain;
    a second RSC converting the plurality of second modulation data symbols into a plurality of second real signals of a time domain from a frequency domain; and
    an angle modulation unit angle-modulating the first real signals into a first angle modulation signal and angle-modulating the second real signals into a second angle modulation signal.

2. The data transmitting apparatus of claim 1, wherein the first angle modulation signal comprises a cosine signal and the second angle modulation signal comprises a sine signal.

3. The data transmitting apparatus of claim 2, wherein the angle modulation unit selects the second angle modulation signal from a plurality of available angle modulation signals for the second real signal, such that the function format of a real part and an imaginary part of the first angle modulation signal is different from the function format of a real part and an imaginary part of the second angle modulation signal.

4. The data transmitting apparatus of claim 1, wherein the first RSC converts the plurality of first modulation data symbols into first real signals through a first inverse fast Fourier transform (IFFT),
    the second RSC converts the plurality of second modulation data symbols into second real signals through a second IFFT, and
    when the size of the first IFFT is N, the number of the plurality of first modulation data symbols is N/2, where N is a positive integer.

5. The data transmitting apparatus of claim 1, further comprising
    a first amplifying unit amplifying the first angle modulation signal to produce a first amplified signal; and
    a second amplifying unit amplifying the second angle modulation signal to produce a second amplified signal.

6. The data transmitting apparatus of claim 5, further comprising
    a combiner combining the first and second amplified signals and transmitting the combined signal.

7. The data transmitting apparatus of claim 1, wherein the angle modulation unit combines at least the first and second angle modulation signals to produce a single signal;
    the data transmitting apparatus further comprising
    a power amplifying unit amplifying the single signal.

8. A data receiving apparatus comprising:
    an angle demodulation unit angle-demodulating a reception signal to extract a first phase estimation value with respect to a first input data which has been angle-modulated in a data transmitting apparatus and a second phase estimation value with respect to a second input data which has been angle-modulated in the data transmitting apparatus;
    a first real signal de-converter (RSDC) converting the first phase estimation values into a plurality of first data symbols of a frequency domain from a time domain;
    a second RSDC converting the second phase estimation values into a plurality of second data symbols of a frequency domain from a time domain;
    a first symbol demapper performing demapping on the plurality of first data symbols to restore the first input data; and
    a second symbol demapper performing demapping on the plurality of second data symbols to restore the second input data.

9. The data receiving apparatus of claim 8, wherein the angle demodulation unit calculates an average value from the reception signal, and extracts phase estimation values with respect to the first and second input data from a signal obtained by subtracting the average value from the reception signal.

10. The data receiving apparatus of claim 9, wherein an imaginary part of the signal obtained by subtracting the average value from the reception signal is a phase estimation value with respect to the first input data, and a real part of the signal obtained by subtracting the average value from the reception signal is a phase estimation value with respect to the second input data.

11. The data receiving apparatus of claim 8, wherein each of the first and second RSDCs comprises:
    a serial-to-parallel converter (SPC) converting the corresponding first and second phase estimation values from a serial signal to a parallel signal;
    a fast Fourier transform (FFT) unit performing FFT on the corresponding parallel signal to generate the plurality of first and second data symbols; and
    an output unit outputting a portion of the plurality of first and second data symbols to the first and second symbol demappers, respectively.

12. The data receiving apparatus of claim 8, further comprising
    a signal processing unit compensating for the amplitude of the reception signal by a size adjusted by the data transmitting apparatus.

13. A method for transmitting data by a data transmitting apparatus, the method comprising:
    performing symbol-mapping on a first input data to generate a plurality of first modulation data symbols;
    performing symbol-mapping on a second input data to generate a plurality of second modulation data symbols;
    performing a first inverse FFT (IFFT) on the plurality of first modulation data symbols to convert the plurality of first modulation data symbols into first real signals of a time domain from a frequency domain;

performing a second IFFT on the plurality of second modulation data symbols to convert the plurality of second modulation data symbols into second real signals of a time domain from a frequency domain;

angle-modulating the first real signals into a first signal; and angle-modulating the second real signals into a second signal.

14. The method of claim 13, further comprising amplifying each of the first and second signals according to a pre-set gain value.

15. The method of claim 13, wherein when the size of the first IFFT is N, the number of the plurality of first modulation data symbols is N/2 and N is a positive integer.

16. The method of claim 13, wherein the first signal comprises a cosine signal;

the second signal comprises a sine signal; and the angle-modulating comprises:

selecting one of a plurality of available angle modulation signals available for the first real signal, as the first signal;

wherein a function format of a real part and an imaginary part of the first signal is different from a function format of a real part and an imaginary part of the second signal.

17. The method of claim 13, further including conjugating the plurality of first modulation data symbols to produce a plurality of additional input signals to the first IFFT.

18. A method for receiving data by a data receiving apparatus, the method comprising:

compensating for the amplitude of a reception signal by an amount which has been adjusted by a data transmitting apparatus;

angle-demodulating the amplitude-compensated reception signal to extract first and second phase estimation values with respect to first and second input data which have been angle-modulated by the data transmitting apparatus;

performing a first fast Fourier transform (FFT) on the first phase estimation values to convert the first phase estimation values into a plurality of first parallel data symbols of a frequency domain from a time domain;

performing a second fast Fourier transform (FFT) on the second phase estimation values to convert the second phase estimation values into a plurality of second parallel data symbols of a frequency domain from a time domain;

demapping the first parallel data symbols to restore them into first input data and demapping the second parallel data symbols to restore them into second input data.

19. The method of claim 18, wherein the size of the first FFT is N, the number of first parallel data symbols is N/2, and N is a positive integer.

20. The method of claim 18, wherein the extracting comprises:

calculating an average value from the reception signal;

extracting a phase estimation value with respect to the first input data from an imaginary part of a signal obtained by subtracting the average value from the reception signal; and extracting a phase estimation value with respect to the second input data from an imaginary part of the signal obtained by subtracting the average value from the reception signal, wherein the first and second input data are data which have been angle-modulated by a sine function, respectively.

* * * * *